Dec. 16, 1952 R. G. LE TOURNEAU 2,621,939
ADAPTER FOR TWO-WHEEL SCRAPERS
Filed Oct. 13, 1949 2 SHEETS—SHEET 1
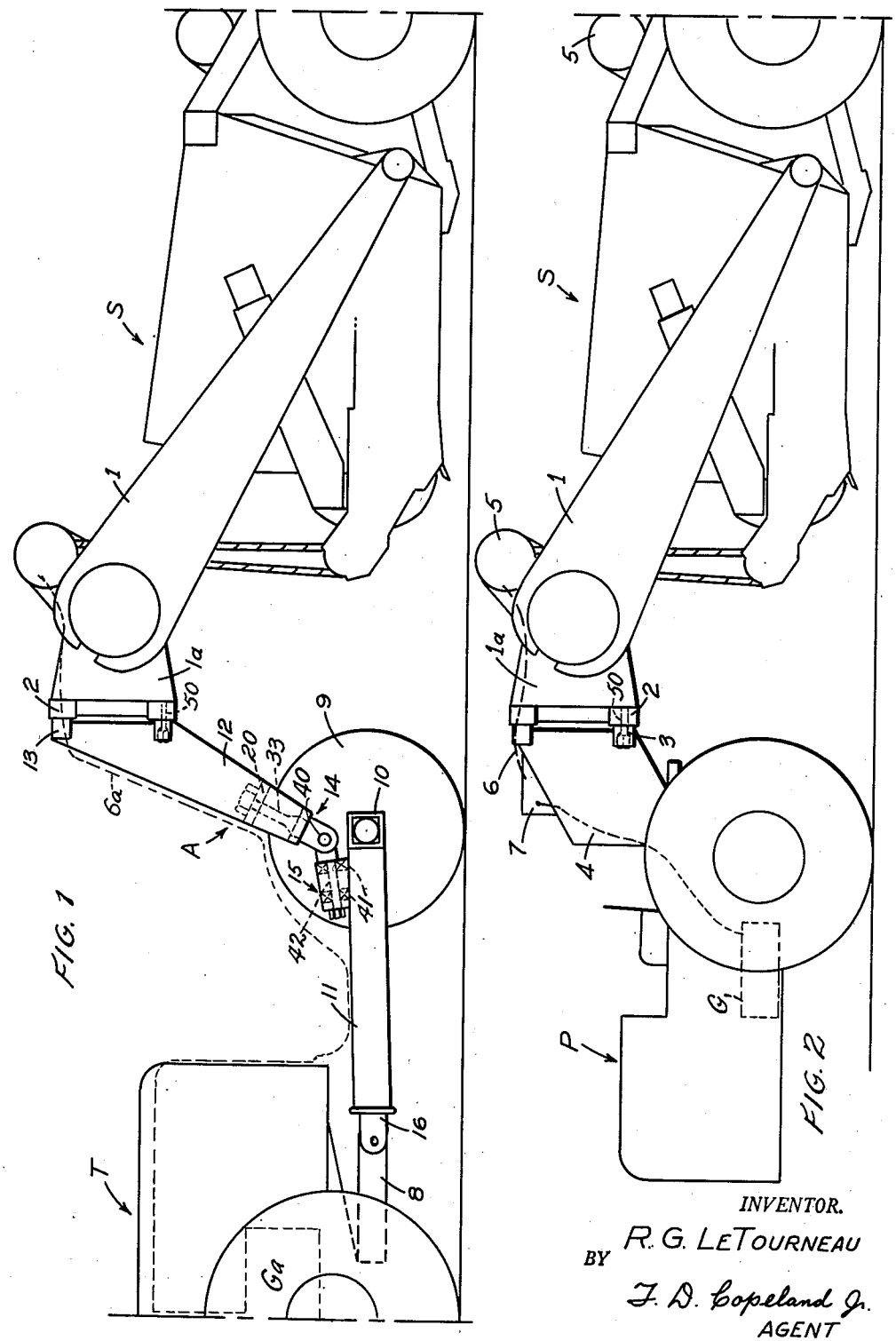
INVENTOR.
R. G. LeTourneau
BY
F. D. Copeland Jr.
AGENT Dec. 16, 1952   R. G. LE TOURNEAU   2,621,939
ADAPTER FOR TWO-WHEEL SCRAPERS
Filed Oct. 13, 1949   2 SHEETS—SHEET 2
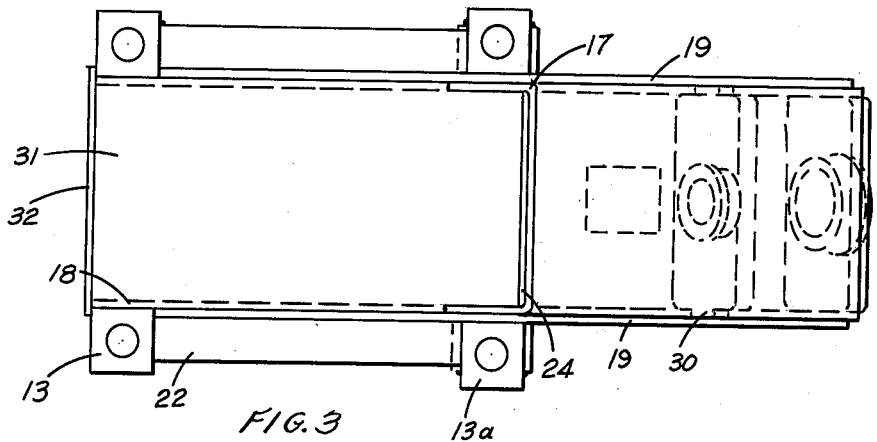
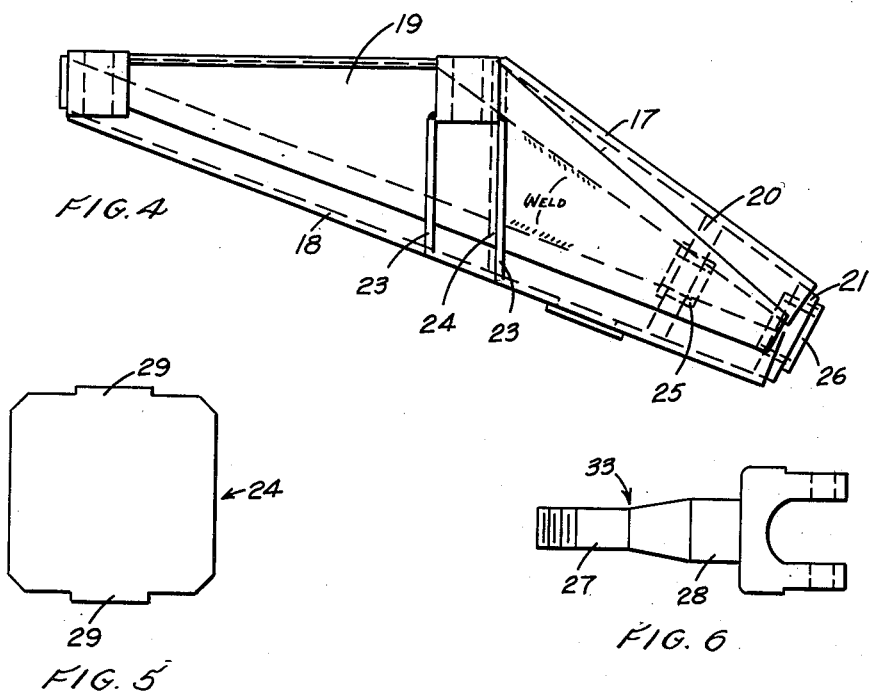
INVENTOR.
R. G. LeTourneau
BY F. D. Copeland Jr.
AGENT Patented Dec. 16, 1952

2,621,939

UNITED STATES PATENT OFFICE 2,621,939

ADAPTER FOR TWO-WHEEL SCRAPERS

Robert G. Le Tourneau, Longview, Tex.

Application October 13, 1949, Serial No. 121,087

5 Claims. (Cl. 280—33.4)

This invention relates generally to earth working scrapers and has for its primary object to provide an adapter to permit the two-wheel scraper of a normally self-propelled scraper combination to be used as a tractor-drawn scraper.

An additional object is to provide an adapter which may readily be installed for its operative purpose.

A further object is to provide an adapter which is simple and made of relatively light weight materials, but which by its construction and bracing results in a sturdy rugged device which is very effective for the purpose intended.

Other objects of this invention will become apparent from a perusal of the following specification and claims.

In the drawing:

Fig. 1 is an elevational view in outline showing the adapter installed in its operational position between a draw bar tractor and a two wheel scraper. The nearest wheel of the adapter is removed to show the universal connection.

Fig. 2 is a similar view of the two wheel scraper in its normal position of engagement with a two wheel prime mover.

Fig. 3 is a plan view of the stationary structure of the complete adapter showing details of its construction.

Fig. 4 is a side view of the same.

Fig. 5 is a plan view of an internal reinforcing web used in this construction.

Fig. 6 is a detail view of the vertical universal spindle used to connect the stationary structure to the wheel unit of this adapter.

Referring to the drawing in Fig. 2, the two wheel scraper S is seen to include a surrounding yoke 1, and an attaching hitch 1a for connecting with a two wheel prime mover P by means of four bolt blocks 2 of the scraper hitch 1a and four corresponding bolt blocks 3 of the prime mover steering hitch 4. The bolt blocks of the two units meet in the same vertical plane. Bolts 50 secure bolt blocks 2 and 3 and consequently the adapter and scraper together in rigid relationship.

All of the functions of scraper S are electrically controlled by separate electric motor units 5 mounted thereon. These units receive their power from a generator G mounted on the prime mover. The only operational connection, therefore, between the two units is a multiple lead electric cable 6 which leads from switch box 7 to the various motors 5 of the scraper.

This combination is known in the trade as a "self-propelled scraper," and details of its construction may be seen in Patent No. 2,495,336, dated January 24, 1950, and Patent No. 2,454,070, dated November 16, 1948; both patents being owned by the assignee of the present application.

When it is desired to use this scraper as a drawn scraper with free rolling front wheels in place of front drive wheels, a rubber-tired adapter A is inserted between the scraper S and a tractor T having a draw bar 8. This tractor also includes a generator Ga so that the operational connection between the two units in this arrangement is also limited to an electric cable 6a corresponding to the cable 6 shown in Fig. 2.

The complete adapter A is seen in Fig. 1 to consist basically of: a movable group or carriage including, a pair of rubber-tired wheels 9, an axle 10, and a forwardly extending draft arm 11; and a stationary group including, an upstanding prismoidal structure 12 which includes bolt blocks 13 for rigidly attaching the complete adapter A to the scraper S. The movable and stationary groups are joined by a universal connection comprising the members indicated generally at 14 and 15 to permit steering the scraper by turning the adapter wheels 9, and to permit relative lateral tilt between the scraper and the movable group of the adapter as well as longitudinal vertical tilt between these units. A third universal connection 16 attaches the adapter-scraper combination to the tractor draw bar 8.

Examining the structure 12 more in detail in Figs. 3 and 4, it is seen to consist of opposed channels 17 and 18 angularly disposed and rigidly connected, as by internal welding to triangular side plates 19. The channels 17 and 18 converge to a connection with spaced bearing blocks 20 and 21 at the lower end of the structure 12 when the latter is in its functional position. The bolt blocks 13 are welded to the outside of the channel 18 and blocks 13a are welded to the outside of plates 19. The bolt blocks are braced by longitudinal webs 22 and triangular webs 23. The entire structure is further reinforced by an internal web 24. The blocks 20 and 21 include respectively bushings 25 and 26 which engage the machined surfaces 27 and 28 of universal spindle 33. This spindle together with bushings 25 and 26 and a thrust nut make up the vertical universal connection 14 which permits steering of the adapter wheels. This connection is the same general construction as that shown in Patent No. 1,983,860.

Both web 24 and bearing block 20 include projections 29 and 30 respectively which engage the internal surfaces of side plates 19 to further stiffen and reinforce them at their unsupported area. The last piece to be welded into this structure 12 is face plate 31 which together with top plate 32 provides increased stability and prevents bolt blocks 13 and 13a from twisting out of their relative positions.

Bearing box assembly 15, of conventional structure, is inclined relative to draft arm 11 and is pin connected to spindle 33 by means of pin 40. Bearing box assembly 15 contains spaced bearings 41, which rotatably support swivel 42 which projects therefrom for connection with spindle 28 projecting from the lower end of connection 14 of adapter A. The two assemblies 14 and 15 together comprise a universal connection between the draft arm 11 and scraper S, so that the front wheels 9 of the scraper may rise and fall with the contour of the ground and may turn in a horizontal direction with the draft arm for steering the scraper.

From the foregoing description, it will be readily seen that there has been produced such a device as substantially fulfills the objects of the invention as set forth herein.

While this specification sets forth in detail the present and preferred construction of the device, still in practice such deviation from such detail may be resorted to as do not form a departure from the spirit of the invention as defined by the appended claims.

Having thus described my invention, the following is claimed as new and useful, and upon which Letters Patent is desired:

1. An adapter for providing front running wheels for a two-wheel scraper with an upper hitch containing bolt blocks arranged in a vertical plane comprising: a carriage including laterally spaced wheels, an axle supported by said wheels, a forwardly projecting draft arm attached to said axle for connecting the adapter to a draw bar tractor; an upwardly inclined structure universally connected at its lower end to said carriage and adapted to be rigidly connected at its upper end to said upper hitch; said structure comprising angularly disposed channels enclosing spaced bearing blocks at one end, and terminating at the other end in a vertical plane containing a face plate, a spindle journalled in said bearing blocks and projecting from said one end, said spindle comprising a part of said universal connection with the carriage; bolt blocks surrounding said face plate, said last named bolt blocks matching said upper hitch bolt blocks and being adapted to be secured thereto by bolts to thereby attach said scraper and adapter together in rigid relation.

2. An adapter for providing front running wheels for a two-wheel scraper with an upper hitch containing bolt blocks arranged in a vertical plane comprising: a carriage including laterally spaced wheels, an axle supported by said wheels, a forwardly projecting draft arm attached to said axle for connecting the adapter to a draw bar tractor; an upwardly inclined structure universally connected at its lower end to said carriage and adapted to be rigidly connected at its upper end to said upper hitch; said structure comprising angularly disposed channels enclosing spaced bearing blocks at one end, and terminating at the other end in a vertical plane containing a face plate, a spindle journalled in said bearing blocks and projecting from said one end, said spindle comprising a part of said universal connection with the carriage; side plates overlapping said channels, a reinforcing web connecting said channels and side plates internally, bolt blocks surrounding said face plate, said last named bolt blocks matching said upper hitch bolt blocks and being adapted to be secured thereto by bolts to thereby attach said scraper and adapter together in rigid relation.

3. An adapter for providing front running wheels for a two-wheel scraper with an upper hitch containing bolt blocks arranged in a vertical plane comprising: a carriage including laterally spaced wheels, an axle supported by said wheels, a forwardly projecting draft arm attached to said axle for connecting the adapter to a draw bar tractor; an upwardly inclined structure universally connected at its lower end to said carriage and adapted to be rigidly connected at its upper end to said upper hitch; said structure comprising angularly disposed channels enclosing spaced bearing blocks at one end, and terminating at the other end in a vertical plane containing a face plate, a spindle journalled in said bearing blocks and projecting from said one end, said spindle comprising a part of said universal connection with the carriage; side plates overlapping said channels, a reinforcing web connecting said channels and side plates internally, and bolt blocks surrounding said face plate, said last named bolt blocks matching said upper hitch bolt blocks and being adapted to be secured thereto by bolts to thereby attach said scraper and adapter together in rigid relation, said spaced bearing blocks including axially aligned bushings.

4. In an adapter for providing front running wheels for a two wheel scraper, a prismoid structure comprising front and rear channels, generally triangular side plates overlapping said channels and welded thereto on their inner sides, the lower end of said structure converging toward and enclosing spaced bearing blocks, the upper end of said structure terminating at and attached to a vertical position face plate, a spindle journalled in said bearing blocks and projecting from said one end, said spindle comprising a part of said universal connection with the carriage; bolt blocks surrounding said face plate and attached to the exterior of said structure, external webs connecting certain pairs of said bolt blocks, a top plate connecting the bolt blocks, and an internal web connected to said channels and side plates in a plane at right angles to said external webs, said bolt blocks being adapted to be bolted to said scraper to attach said scraper and adapter in rigid relation.

5. In an adapter for providing front running wheels for a two wheel scraper with an upper hitch containing bolt blocks in a vertical plane and including functional electric motors to permit operation of said scraper in conjunction with a draw bar tractor including an electric generator, comprising: a carriage including laterally spaced wheels, an axle supported by said wheels, a forwardly projecting draft arm attached to said axle for connecting the adapter to said draw bar tractor, a slightly upwardly inclined bearing box assembly on said draft arm; an upwardly inclined prismoid structure universally connected at its lower end to said carriage and being adapted to be rigidly connected at its upper end to said scraper, comprising: angularly disposed channels enclosing vertically spaced bearing blocks, a spindle journalled in said bearing blocks, one end of said spindle projecting from the lower bearing blocks, said projecting end being connected to said bearing box assembly to form said universal connection, side plates overlapping said channels, a reinforcing web connecting said channels and side plates internally, and bolt blocks surrounding said face plate, said last named bolt blocks matching said upper hitch bolt blocks to form said upper end connection of said prismoid structure.

ROBERT G. LE TOURNEAU.

REFERENCES CITED

The following references are of record in the file of this patent:

UNITED STATES PATENTS

| Number | Name | Date |
|---|---|---|
| 721,525 | Rand | Feb. 24, 1903 |
| 1,018,390 | Johnson | Feb. 20, 1912 |
| 1,160,690 | Choate | Nov. 16, 1915 |
| 2,360,903 | Simmons | Oct. 24, 1944 |
| 2,519,564 | Hagg | Aug. 22, 1950 |